United States Patent Office 3,163,547
Patented Dec. 29, 1964

3,163,547
AQUEOUS POLISH COMPOSITION
Mel L. Vietor, Stillwater, Minn., assignor to Minnesota Mining and Manufacturing Company, St. Paul, Minn., a corporation of Delaware
No Drawing. Filed Jan. 24, 1961, Ser. No. 84,485
7 Claims. (Cl. 106—6)

This invention relates to an aqueous polishing composition driable to a bright surface without requiring buffing.

The composition of this invention is useful as a polish in which the ingredients are dispersed in water by means of a dispersing agent or dispersing agents. The polish is of the well known dry bright type which needs only be applied to the surface to be polished, such as a floor, and then permitted to dry to form a bright protective surface. This type of polish is, of course, well known in the art and is widely used.

One of the problems with a polish of this type is to provide good coverage of the surface so that upon spreading the polish over the surface it will uniformly cover the surface to produce a uniform film upon drying. In other words, the polishing composition must have good leveling characteristics. An object of this invention is to provide a new and useful leveling agent for aqueous emulsion polish compositions.

Still another object of this invention is to provide a fluorochemical leveling agent of superior properties over other fluorochemical leveling agents for use in aqueous emulsion polish compositions.

Still another object of this invention is to provide a method for preparing an aqueous emulsion polish composition.

Still another object of this invention is to provide a new and novel polish composition which has substantially non-yellowing properties on porous and absorptive surfaces.

This invention provides an improved polishing composition driable to a bright surface without requiring buffing, which polish composition comprises an aqueous vehicle, a non-volatile, water insoluble film former, a dispersing agent present in an amount sufficient to form a stable dispersion of the film former in the vehicle with the dispersion breaking down upon evaporation of the vehicle to form a thin layer of the film former on a surface, thereby depositing the film former in a smooth, bright layer on the surface, and about 0.0025 to about 1 percent by weight of the composition of a perfluorocycloaliphatic acid or salt thereof having between about 7 and 12 carbon atoms per molecule, as a leveling agent.

The polishing composition of this invention comprises a continuous phase aqueous base constituting at least about 50 percent by weight of the composition and up to about 50 percent polish materials dispersed or dissolved in the aqueous base. These polish materials include non-volatile, solid film formers, emulsifiers which may be either anionic, cationic, or non-ionic to serve as emulsifying and dispersing agents for the dispersed solid film formers, and from about 0.0025 percent or less to about 1 percent by weight of the composition of a perfluorocyclo leveling agent.

The perfluorocyclo leveling agents of this invention to be used in the aqueous emulsion polish compositions comprise perfluorinated alkyl-substituted cyclohexane acids and salts thereof and perfluorinated cyclohexylalkane acids and salts thereof. Preferably, the acids and salts of the aforesaid leveling agents include the sulfonic acids, carboxylic acids and phosphonic acids and the alkali metal, ammonium and alkaline earth metal salts of the above acids. The preferred perfluoroalkyl-substituted cyclohexane acids and derivatives are the sulfonic acids and salts of the following representative formula:

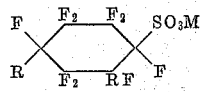

in which R is a perfluoroalkyl radical or fluorine, and at least one R is a perfluoroalkyl radical, and M is hydrogen or ammonium or an alkali metal or alkaline earth metal. The total number of carbon atoms of the R groups combined is between about 1 and about 6 carbon atoms. Preferred perfluoroalkyl-substituted cyclohexane sulfonic acids and salts include 4-perfluoro-n-butylcyclohexane sulfonic acid, 4-perfluoroisobutylcyclohexane sulfonic acid, 4-perfluoro secondary butylcyclohexane sulfonic acid, 2,4-perfluorodiethylcyclohexane sulfonic acid, 4-perfluoromethylcyclohexane sulfonic acid, and 4-perfluoroisopropylcyclohexane sulfonic acid, and 2,4-perfluoroisopropylcyclohexane sulfonic acid, the potassium salt of each of the above.

The preferred perfluorocyclohexylalkane acids and salts are the sulfonic acids and salts of the following representative formula:

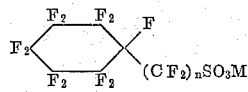

in which $n$ is from 1 to 6 and M is hydrogen, an alkali metal, or an alkaline earth metal. The preferred perfluorocyclohexylalkane sulfonic acids and salts include perfluorocyclohexylperfluoroethane sulfonic acid, perfluorocycloperfluoromethane sulfonic acid and perfluorocyclohexylperfluoropropyl sulfonic acid and the potassium salt thereof.

Generally, these leveling agents are utilized in admixtures of two or more since the source of the aromatic hydrocarbons from which the leveling agents are prepared are in themselves admixtures. The aromatic hydrocarbon starting materials are derived from the coal tar industry. These leveling agents of the above specific type are disclosed together with the method of making them in Patent No. 2,732,398, filed August 24, 1954, and issued January 24, 1956; and Patent No. 2,593,737, filed June 27, 1951, and issued April 22, 1952.

The acid radical of the leveling agent is hydrophilic and constitutes the water solubilizing portion of the compound. Although many of the above compounds may be only slightly soluble in water, they are still operable in aqueous surface coating compositions because only a very small amount is required. In general, the smallest amount of fluorocarbon compound suitable to produce the desired leveling characteristics is used so that an unnecessary excess may be avoided. Thus, tests have shown that the minimum amount of perfluorocyclocarbon compound necessary in certain instances is ordinarily preferably about 0.01 percent or less by weight of the entire surface coating composition. The maximum amount ordinarily does not exceed about 1 percent by weight.

Tests have shown that the perfluorocyclocarbon compounds have unusually unexpected characteristics in improving the leveling in aqueous based self-polishing floor polishes. This permits the formation of more uniform films, particularly on those surfaces which are not usually well coated by dry-bright polishes. These compounds also prevent yellowing of the polish on surfaces on repeated applications and upon aging.

The self-polishing aqueous based polishes have been found to have improved leveling when they each contain one or a combination of the perfluorocyclocarbon compounds of this invention. Tests have proven that the leveling is improved in these water based self-polishing polishes generally without regard to the type of coating material or film former dispersed in the aqueous base. In general, these aqueous based self-polishing polishes have five basic types of film formers. These are generally classified as follows:

(1) A relatively large amount of wax, over 50 parts by weight, and relatively low amount of resin, up to 50 parts by weight, in the dispersed film formers.

(2) A relatively large amount of resin, over 50 parts by weight, and relatively low amount of wax, up to 50 parts by weight, in the dispersed film formers.

(3) Synthetic polymer types of film formers.

(4) All resin film formers.

(5) All wax film formers.

In the above classes 1 and 2 the total parts in each are 100.

In all of these types of water based self-polishing polishes wherein the film former is dispersed in the water, leveling was improved by the addition of the perfluorocyclocarbons of this invention. Representative polish compositions and their methods of formulation are given in the following examples. These examples are exemplary of the basic types of self-polishing polish compositions to show that the improved leveling is achieved in water based self-polishing polishes generally. Thus, the tests have indicated that whenever an aqueous base self-polishing polish is usable on a surface such as a floor, its leveling characteristics are improved by the addition of a perfluorocyclocarbon compound of this invention.

*Example 1*

In this example of a floor polish prepared according to this invention:

A. An aqueous dispersion was prepared at room temperature containing 8000 parts by weight of an aqueous dispersion of a polystyrene having a solids content of approximately 36 percent, to which is added a homogeneous premix of 192 parts by weight of tributoxyethyl phosphate and 240 parts by weight of dibutyl phthalate, followed by about 1.3 parts by weight of approximately a 70:30 weight ratio mixture of the potassium salt of 2,4-perfluorodiethylcyclohexane sulfonic acid and the potassium salt of 4,2-perfluoro secondary butylcyclohexane sulfonic acid in the above list. The phosphate and the phthalate compounds are plasticizers for the polystyrene. The resulting composition which contained about 39 percent solids was diluted with 2 volumes of soft water to produce a solids content of approximately 13 percent. The dispersion of a polystyrene has the trade name "Ubatol U–2001." The dispersed polystyrene particles are of less than 0.03 micron average diameter and carry negative charges. The polystyrene in this compound has a molecular weight of about 150,000–200,000. Instead of the above mentioned plasticizers other plasticizers, such as dibutoxyethyl phthalate, may be used. The amount of the plasticizer is preferably kept as low as possible and this amount can be as low as 11 percent by weight of the solids content of the composition.

B. A second composition was then prepared by mixing 110 parts by weight of an oxidized polyethylene, 22 parts by weight of red oil which is essentially oleic acid and 22 parts by weight of morpholine, which are melted together and poured into 846 parts by weight of water at 120° F. with sufficient agitation to emulsify. The oxidized polyethylene is identified as "AC polyethylene 629." The oxidized polyethylene of this product has an average molecular weight of about 2000, a saponification value and acid number of about 14–17, a melting point of about 205–208° F. and a viscosity of 40–50 Saybolt Furol seconds at 140° C. 30 cc. efflux.

C. A third composition was then prepared by dispersing 450 parts by weight of shellac in a solution consisting of 54 parts by weight of sodium tetraborate pentahydrate (5 mol borax) in 3696 parts by weight of water at about 120° F. The amount of 5 mol borax can be between 11–13 percent by weight of the shellac present.

D. The above three compositions A, B and C were then mixed together in the proportions of 60 parts by volume of composition A, 10 of B and 30 of C to form the final composition. In each instance herein where the amount of each ingredient is given as parts by weight these parts are all the same unit. In this example, each unit is one gram.

In preparing the composition of this example, the perfluorocyclocarbon compound is added initially to the plasticized polystyrene dispersion in an amount of about 0.005 percent by weight of the final composition.

The above composition was found to have excellent leveling characteristics when merely poured on a surface such as a black rubber floor tile with the excess removed by holding the tile vertically. The tile was coated uniformly and the coating dried to a bright surface.

The perfluorocyclocarbon compound is additionally important as it permits a large reduction in the amount of shellac used while still producing a superior composition. Thus, prior compositions having satisfactory leveling and luster characteristics employed as much as 75 percent or more of shellac by weight of the solids present to produce desired characteristics in the coating composition. By using a fluorocarbon compound of the type described herein this amount of shellac was reduced to about 17 percent or less. No other compound has been discovered that is so successful with such a small amount of shellac.

In the above example, the film former that is dispersed in the aqueous carrier is the polymer polystyrene. In this formula is also included shellac dispersed by means of an alkali. In general, the polystyrene formulas similar to this example contain about 50–75 percent by weight of an aqueous dispersion of a polystyrene, about 10–20 percent by weight of an aqueous dispersion of an oxidized polyethylene, and about 15–30 percent by weight of an aqueous alkaline dispersion of shellac.

*Example 2*

Another surface coating composition capable of drying to a bright coating has the following composition:

| | Approximate parts by weight |
|---|---|
| Softened water | 7133 |
| Caustic soda | 9.5 |
| Borax, 5 mol. | 100 |
| Oxidized microcrystalline wax | 169 |
| Terpene-phenolic condensation resin | 103 |
| Red oil (oleic acid) | 44 |
| Shellac | 775 |
| | 8333.5 |

About 0.01 percent of the potassium salt of perfluorocyclohexylperfluoroethane sulfonic acid by weight of the above composition was found to greatly improve the leveling characteristics of this polish.

In each of the compositions in the examples given above, the presence of any one or a combination of the above listed perfluorocyclocarbons has been found to improve the leveling of these self-polishing aqueous based polishes. As can be seen, the exemplary polish compositions are representative of the several different types of self-polishing polish compositions. Each of the perfluorocyclocarbon compounds of this invention was found to improve the leveling in all types of aqueous self-polishing polishes wherein the film former is dispersed in the aqueous continuous phase.

The above examples illustrate commonly recognized types of water based self-polishing polishes which dry to a bright protective finish without requiring buffing. These examples therefore illustrate the fact that the leveling agents of this invention essentially are not specific to any one type of formulation, but improve the leveling characteristics of all types of water based self-polishing polishes so as to give a more uniform protective coating of the polished surface.

As set out above, the basic polish formula of this invention includes at least about 50 percent aqueous vehicle and up to about 50 percent polish ingredients. In general, the polish content will be between 5 percent and 50 percent with the preferred limit being about 10–50 percent. The polish ingredients include non-volatile film formers which may be either natural or synthetic waxes, natural or synthetic polymers and natural and synthetic resins and mixtures thereof and also include emulsifying and dispersing agents for dispersing the solids in the aqueous vehicle or base which is the continuous phase of the polish composition. The emulsifying and dispersing agent is present to perform its well known function and as is customary in this art is present in an amount sufficient to form a stable dispersion of the film former in the aqueous vehicle or base so that the dispersion will break down upon evaporation of the aqueous vehicle to form a thin layer of the film former on the surface thereby depositing the film former in a smooth bright layer on the surface primarily by reason of the inclusion in the composition of the above described perfluorocyclocarbon leveling agent.

Although the basic ingredients are the aqueous vehicle and non-volatile film former, the emulsifier and dispersing agent, and the perfluorocyclocarbon leveling agent, it is, of course, well known in this art that modifiers may also be included for each of these ingredients as is illustrated in the preceding examples.

As mentioned, the film formers include waxes, polymers, resins and mixtures thereof.

The waxes include animal, vegetable, mineral, and synthetic waxes and wax-like materials. These waxes are all well known in this art and include: beeswax, microcrystalline, oxidized microcrystalline, paraffin, montan, ozokerite, carnauba, candelilla, ouricury, palm, whale, sugar cane, esparto, lanolin, polyethylene, and telomers of ethylene with saturated organic compounds containing only carbon, hydrogen and oxygen, e.g., an alcohol, aldehyde, ketone, acid, ester, orthoester, acid anhydride, ether or acetal as disclosed in U.S. Patent No. 2,395,292.

As examples of natural and synthetic resins and polymers, the following are typical:

Shellac, manila loba, "Amberol 750"—condensation product of maleic or fumaric anhydride with rosin and mixed polyhydroxy alcohols, "No. 3551"—condensation product of maleic anhydride and pentaerythritol, "No. 2694–C"—condensation product of maleic and high molecular weight glycols, resins listed in U.S. Patent No. 2,839,482, polyvinyl acetate, polyvinyl chlorideacetate, polyvinyl chloride, copolymers of vinylidene chloride and acrylonitrile, terpene resins, terpene phenolic resins, copolymer of vinyl acetate and crotonic acid, copolymers of butadiene and styrene, polyvinylidene chloride, polymers of alkyl acrylates, allyl acrylate, methallyl acrylate, allyl methacrylate, crotyl acrylate, crotyl methacrylate, allyl ethacrylate, allyl cinnamate, methallyl methacrylate, ethallyl acrylate, ethallyl methacrylate, allyl alphaphenylacrylate, allyl alphachloroacrylate, acrylic acid, methacrylic acid, diallyl phthalate, dimethallyl phthalate, diallyl maleate, diallyl succinate, diallyl oxalate, divinyl benzene, dimethallyl itaconate, diethallyl itaconate, diallyl malonate, diallyl allyl malonate, diallyl citrate, triallyl citrate, diallyl fumarate, diallyl acetone, divinyl ether, diallyl ether, dimethallyl ether, glycol diacrylate (ethylene diacrylate) glycol dimethacrylate, glyceryl diacrylate, glyceryl dimethacrylate, glycol diethacrylate, trivinyl benzene, and mixtures thereof.

Among the emulsifying and dispersing agents that are useful for dispersing the film formers in the aqueous vehicle, the following are well known and customarily used in this art:

Morpholine salts of fatty acids of 12–18 carbon atoms such as morpholine oleate and stearate, acetates of n-primary amines having 12–18 carbon atoms in amine chain such as n-dodecyl amine acetate, n-octadecyl amine acetate, n-octadecenyl amine acetate and n-octadecadienyl amine acetate; monoesters of polyethylene glycols and fatty acids of 12–18 carbon atoms such as hexaethylene glycol monooleate; alkylated aryl polyether alcohols; alkali metal soaps of fatty acids of 12–18 carbon atoms; soaps of alkalis such as alkanolamines, borax, morpholine, ammonia, alkali metals, and the like with acids such as oleic acid, red oil, mixed amino fatty acids, and the like; di-n-octyl sodium sulfosuccinate; oleic acid condensate of polyethylene oxide; sodium salt of a secondary alkyl sulfate; aryl alkyl polyether alcohols; and aryl polyether alcohols.

As mentioned earlier, various modifying agents may be included in the polishing compositions of this invention. Thus, one type of modifier includes plasticizers for the film formers. Customarily, plasticizers in this art include: diethylene glycol diacetate, diacetin, tricresyl phosphate, dibutyl phthalate, butyl phthalyl butyl glycolate, methyl phthalyl ethyl glycolate, trimethylene glycol di-2-ethyl hexoate, trimethylene glycol di-2-ethyl butyrate, and tributoxyethyl phosphate.

As shown in the examples given herein, combinations of each type of ingredient may be used if desired.

The polishing compositions of this invention have a number of advantages over previous well known self-polishing compositions. The polishing compositions are capable of forming a level polish film without requiring the use of additional ingredients to form the film such as acid, heat and the like. The polish is completely stable in bulk but as soon as it has been spread in a thin layer over the surface to be polished will form a continuous clear glossy film in thin layers and at room temperature. It appears that the emulsifier or dispersing agent that is used forms a link between the water of the base and the film former ingredients so that the polishing composition remains stable until the water substantially evaporates. Upon evaporation of the water and other volatile ingredients, the film former coalesces to form the continuous glossy film. The leveling agent contributes to this uniform film forming coalescing, but the exact mechanism of this action is not known.

Having described my invention, I claim:

1. In a polishing composition driable to a bright surface without requiring buffing which polishing composition includes a continuous aqueous phase, a dispersed non-volatile water-insoluble solid film former, a small amount of the dispersing agent present in the aqueous phase in an amount sufficient to form a stable dispersion of the film former in the aqueous phase with this dispersion breaking down upon evaporation of the aqueous constituent of the phase to form a thin layer of the film former on a surface thereby depositing the film former in a smooth, bright, protective layer on said surface, the improvement which comprises including in said polished composition a leveling agent in an amount between about 0.0025 and about 1 percent by weight selected from at least one of the group consisting of a perfluorinated alkyl-substituted cyclohexane acid, perfluorinated cyclohexyl-alkane acid and a salt thereof different from said dispersing agent, said acid and salt being selected from the group consisting of sulfonic acid, carboxylic acid and phosphonic acid and the alkali metal salt, the ammonium salt and the alkaline earth metal salt of such acids.

2. The composition of claim 1 in which said leveling agent is an alkali metal salt of a perfluorinated alkyl-substituted cyclohexane sulfonic acid.

3. The composition of claim 1 in which said leveling agent is the perfluorinated potassium salt of 4-secondary butylcyclohexane sulfonic acid.

4. The composition of claim 1 in which said leveling agent is the perfluorinated potassium salt of 2,4-diethyl-cyclohexane sulfonic acid.

5. The composition of claim 1 in which said leveling agent is the perfluorinated potassium salt of 4-n-butyl-cyclohexane sulfonic acid.

6. The composition of claim 1 in which said leveling agent is the perfluorinated potassium salt of 4-isopropylcyclohexane sulfonic acid.

7. The composition of claim 1 in which said leveling agent is the perfluorinated potassium salt of cyclohexylethane sulfonic acid.

References Cited in the file of this patent

UNITED STATES PATENTS

| | | |
|---|---|---|
| 2,593,737 | Diesslin et al. | Apr. 22, 1952 |
| 2,780,554 | Lerner | Feb. 5, 1957 |
| 2,782,124 | Von Rosenberg et al. | Feb. 19, 1957 |
| 2,915,554 | Ahlbrecht et al. | Dec. 1, 1959 |
| 2,937,098 | Geen | May 17, 1960 |

OTHER REFERENCES

Morrison et al.: "Organic Chemistry," pp. 27, 109 and 196, published by Allyn and Bacon, Boston, 1959.

Chemical Abstracts, "Polymerization of Tetrafluoroethylene," vol. 54, p. 21,858.